(12) United States Patent
Jakob et al.

(10) Patent No.: US 9,921,034 B2
(45) Date of Patent: Mar. 20, 2018

(54) SIGHT DEVICE

(71) Applicant: MB-Microtec AG, Niederwangen bei Bern (CH)

(72) Inventors: Daniel Jakob, Schoenbuehl (CH); Hannes Kind, Bern (CH)

(73) Assignee: MB-Microtec AG, Niederwangen bei Bern (CH)

( * ) Notice: Subject to any disclaimer, the term of this patent is extended or adjusted under 35 U.S.C. 154(b) by 0 days.

(21) Appl. No.: 15/029,680

(22) PCT Filed: Oct. 13, 2014

(86) PCT No.: PCT/EP2014/071922
§ 371 (c)(1),
(2) Date: Apr. 15, 2016

(87) PCT Pub. No.: WO2015/055596
PCT Pub. Date: Apr. 23, 2015

(65) Prior Publication Data
US 2016/0238343 A1    Aug. 18, 2016

(30) Foreign Application Priority Data

Oct. 17, 2013   (AT) ............................... A 50670/2013

(51) Int. Cl.
*F21S 4/00*      (2016.01)
*G06F 19/00*   (2018.01)
(Continued)

(52) U.S. Cl.
CPC ............ *F41G 1/345* (2013.01); *G02B 6/0003* (2013.01); *G02B 23/105* (2013.01); *G02B 23/2469* (2013.01); *G21H 3/02* (2013.01)

(58) Field of Classification Search
USPC ......................................... 362/583; 235/400
See application file for complete search history.

(56) References Cited

U.S. PATENT DOCUMENTS 3,409,770 A    11/1968   Clapham, Jr.
4,695,159 A *   9/1987   Cannon ..................... F41G 1/34
                                                           356/247
(Continued)

FOREIGN PATENT DOCUMENTS

CN    1396485 A    2/2003
CN    1470918 A    1/2004
(Continued)

OTHER PUBLICATIONS

International Search Report of PCT/EP2014/071922, dated Dec. 9, 2014.
(Continued)

*Primary Examiner* — Tuyen K Vo
(74) *Attorney, Agent, or Firm* — Collard & Roe, P.C.

(57) ABSTRACT

The invention relates to a sight device (1), in particular a reflector sight or telescopic sight, which sight device has a lighting apparatus (2) for producing or illuminating a target mark, wherein the lighting apparatus (2) comprises an light guide (3) made of photoluminescent, in particular fluorescent material and a radioluminescent light source (7) coupled to the light guide (3), wherein the light guide (3) is designed to receive ambient light and convert said ambient light into photoluminescence light along at least one segment (4) of the longitudinal extent of the light guide, and wherein the absorption spectrum (10) of the photoluminescent material of the light guide (3) and the emission spectrum (9) of the radioluminescent light source (7) in the visible range can both be characterized by a spectral bandwidth and a center wavelength. In order to increase the luminance of the lighting apparatus and thus the visibility of the target mark, the center wavelength of the emission spectrum (9) of the radioluminescent light source (7) is greater than the center wavelength of the absorption spec- (Continued)

trum (10) of the photoluminescent material of the light guide (3).

22 Claims, 4 Drawing Sheets (51) Int. Cl.

| | | |
|---|---|---|
| *F21V 5/00* | (2018.01) | |
| *F21V 3/00* | (2015.01) | |
| *F21V 21/30* | (2006.01) | |
| *F41G 1/34* | (2006.01) | |
| *G02B 23/10* | (2006.01) | |
| *F21V 8/00* | (2006.01) | |
| *G02B 23/24* | (2006.01) | |
| *G21H 3/02* | (2006.01) | |

(56) References Cited

U.S. PATENT DOCUMENTS

| | | | |
|---|---|---|---|
| 5,210,658 A * | 5/1993 | Foster | G02B 7/007 |
| | | | 359/894 |
| 5,220,453 A * | 6/1993 | McKinley | G02B 17/02 |
| | | | 359/481 |
| 5,653,034 A | 8/1997 | Bindon | |
| 6,385,855 B1 | 5/2002 | Tymianski | |
| 7,627,976 B1 * | 12/2009 | Olson | F41G 1/345 |
| | | | 42/132 |
| 8,189,967 B1 * | 5/2012 | Olson | F41G 1/35 |
| | | | 385/12 |
| 2003/0007343 A1 | 1/2003 | Ohwada et al. | |
| 2004/0021806 A1 | 2/2004 | Ohizumi et al. | |
| 2008/0030836 A1 * | 2/2008 | Tonar | B60R 1/084 |
| | | | 359/271 |
| 2008/0192245 A1 | 8/2008 | Stenton | |
| 2008/0295380 A1 * | 12/2008 | Buckingham | F41G 1/345 |
| | | | 42/131 |
| 2009/0013581 A1 | 1/2009 | Lorocco | |
| 2009/0100735 A1 * | 4/2009 | Schick | F41G 1/345 |
| | | | 42/123 |
| 2011/0107650 A1 * | 5/2011 | Howe | F41G 1/10 |
| | | | 42/132 |
| 2011/0225867 A1 * | 9/2011 | Moore | F41G 1/35 |
| | | | 42/114 |
| 2011/0279894 A1 * | 11/2011 | Schick | F41G 1/345 |
| | | | 359/428 |
| 2011/0280040 A1 | 11/2011 | Schick et al. | |
| 2012/0071836 A1 * | 3/2012 | Forstreuter | A61M 5/31515 |
| | | | 604/208 |
| 2012/0151817 A1 | 6/2012 | Howe et al. | |
| 2012/0224115 A1 * | 9/2012 | Trissel | G02F 1/1335 |
| | | | 349/57 |
| 2012/0231633 A1 * | 9/2012 | Ewert | C23C 14/541 |
| | | | 438/763 |
| 2013/0097881 A1 | 4/2013 | Profos | |
| 2014/0192550 A1 * | 7/2014 | De Zwart | G02B 6/0028 |
| | | | 362/558 |
| 2014/0226214 A1 * | 8/2014 | Edwards | G02B 23/10 |
| | | | 359/630 |

FOREIGN PATENT DOCUMENTS

| | | |
|---|---|---|
| EP | 0 830 559 B1 | 3/1998 |
| WO | 2011/067291 A1 | 6/2011 |

OTHER PUBLICATIONS

Response of Austrian Patent Attorneys to European Patent Office in PCT/EP2014/071955, dated Aug. 14, 2015.

* cited by examiner

SIGHT DEVICE

CROSS REFERENCE TO RELATED APPLICATIONS

This application is the National stage of PCT/EP2014/071922 filed on Oct. 13, 2014, which claims priority under 35 U.S.C. § 119 of Austrian Application No. A 50670/2013 filed on Oct. 17, 2013, the disclosure of which is incorporated by reference. The international application under PCT article 21 (2) was not published in English.

BACKGROUND OF THE INVENTION

1. Field of the Invention

The invention relates to a sight device, in particular a reflector sight or telescopic sight, which comprises a lighting apparatus for generating or illuminating a target mark, wherein the lighting apparatus comprises an light guide made from photoluminescent, in particular fluorescent material and a radioluminescent light source coupled to the light guide, wherein the light guide is designed to receive ambient light along at least one section of its longitudinal extension and convert it into photoluminescent light, and wherein the absorption spectrum of the photoluminescent material of the light guide and the emission spectrum of the radioluminescent light source in the visible range can both be characterized respectively by a spectral bandwidth and a center wavelength.

2. Description of the Related Art

Known sight devices use ambient light (daylight) in order to produce or illuminate a target mark, also referred to as a reticle, e.g. in the form of a crosshair, scale or a point. The ambient light is captured by means of a light bus cable and converted by a photoluminescent dye in the light bus cable into fluorescent and/or phosphorescent light.

In order to obtain a target mark with sufficient brightness at night or at dusk, known sight devices have a radioluminescent light source, the light of which is fed into the light guide and is also converted there into photoluminescent light.

The photoluminescent light produced by the light guide can now be directed or reflected into the beam path of the sight device. In other sight devices the photoluminescent light can illuminate an already existing target mark, e.g. a front sight and/or rear sight.

EP 0 830 559 B1 discloses a sight device with a light bus cable and a trigalight connected to the light bus cable as a radioluminescent light source.

The disadvantage of such lighting apparatuses is that because of insufficient light from the conversion of light into fluorescent light a radioluminescent light source with greater light intensity needs to be selected. This increases not only the cost but also the space required for larger radio light sources. The main problem is that light easily visible to the human eye, e.g. in the green wavelength range, requires the stimulation of suitable fluorescent dyes in the blue or violet range. The production of a sufficient amount of stimulation light of this initially dark color would require a space-occupying (light source of suitably large dimensions) and complex construction (feeding the stimulation light into the light guide with as little loss as possible). Particularly in sight devices only very limited space is available, so that this problem has not yet been solved satisfactorily.

SUMMARY OF THE INVENTION

The aim of the invention is therefore to overcome said disadvantages and provide a sight device which provides a high degree of brightness for the target mark in daylight, at dusk and at night. The construction should be space-saving and inexpensive.

This aim is achieved by means of a sight device of the aforementioned type in that the center wavelength of the emission spectrum of the radioluminescent light source is greater than the center wavelength of the absorption spectrum of the photoluminescent material of the light guide.

Light emitted by the radioluminescent light source is thereby no longer used primarily for stimulating the photoluminescent material in the light guide. Instead of this a large proportion of the light emitted by the radioluminescent light source is directed through the light guide without its wavelength in the light guide changing essentially. In this way the light of the radioluminescent light source is used directly for generating or illuminating the target mark.

Accordingly, the central energy of the light emitted by the radioluminescent light source is smaller than the central energy of the absorption spectrum of the photoluminescent light guide.

The ambient light gathered by the light guide is however still converted into photoluminescent light, in particular fluorescent light. Of course, it would also be possible to use phosphorescent dyes in the light guide, which is why the umbrella term "photoluminescent" is also used in the present application.

A further effect of the invention is that the center wavelength of the emission spectrum of the radioluminescent light source is not much closer to the central wavelength of the emission spectrum of the photoluminescent material of the light guide, so that at least neighboring or at least very similar color tones can be obtained, the overlayering of which results in a much clearer increase in brightness. In a preferred embodiment the light emitted by the radioluminescent light source and the photoluminescent light of the light guide have the same color, whereby the visibility of the target mark can be increased further.

Usually the absorption spectrum of the photoluminescent material of the light guide and the emission spectrum of the radioluminescent light source in the visible range are not restricted to a single wavelength, but can be described by a range of wavelengths. This is characterized by a maximum or a maximum range, which decreases laterally to a greater or lesser extent. The wavelength distribution can be characterized by a spectral bandwidth and a center wavelength respectively. The bandwidth is dependent on the lateral fall of the curve and corresponds to the width at half the height of the peak of the wavelength distribution. Said width is also referred to as the full width at half maximum (FWHM). The center wavelength in the visible range is produced by forming the average of the corresponding wavelength distribution.

The radioluminescent light source is preferably a tritium-light source. In this case the gaseous tritium is enclosed in a capsule, in particular a glass tube. The capsule is coated with a luminescent material. The radiation emitted by the radioactive tritium is converted by the luminescent material into visible light in a specific wavelength range, e.g. green, blue or violet. The luminescent material is also a fluorescent dye which can be selected according to the specifications of the invention (color).

The light guide is preferably made of plastic, in particular polymethyl methacrylate (PMMA) or polystyrene (PS), and contains fluorescent and/or phosphorescent dyes. Different dyes are used depending on the desired color. Thus for example green fluorescent light (~480 nm to 560 nm) can be obtained by zinc sulfide doped with Cu+– and Al3+– as fluorescent dye. A person skilled in the art can easily make a suitable selection of dyes.

Technical fluorescent dyes are made for example from substances such as the very often used zinc sulfide and chemically similar compounds or oxides of rare earth metals. If said compounds are doped with so-called activators, different colours can be produced. As the activators often bivalent and trivalent lanthanoid cations are used. Bivalent europium cations generate blue light for example, whereas the trivalent ones emit red light. Green light is formed for example by Cu+– and Al3+– doped zinc sulfide. It should be noted at this point that said dyes are only given as examples and do not denote a restriction of the invention. Any dye that is configured according to the specifications the invention and its embodiments can be selected. This does not present a problem for a person skilled in the art.

In a section of its longitudinal extension the light guide is exposed to ambient light (indirectly or directly). For example, the light guide runs on an outer side of the sight device or sits behind a window, through which ambient light can enter the light guide. It is also possible to have light guiding means and/or light deflecting means and/or light focusing means which guide the ambient light to the light guide. The ambient light is usually received in radial direction into the light guide.

The term target mark can be defined as both a light pattern (e.g. directed into the beam path) and also a mechanical target mark (e.g. front sight and/or rear sight). The type, form, size and pattern are not subjected here to any restrictions. The target mark (also referred to as a reticle) can be e.g. a cross-hair, a numerical or non-numerical scale, a target point or a target window.

Preferably, the center wavelength of the emission spectrum of the radioluminescent light source is at least 30 nm, preferably at least 50 nm, greater than the center wavelength of the absorption spectrum of the photoluminescent material of the light guide. In this way the spectra are displaced relative to one another sufficiently, which prevents a large proportion of the light emitted by the radioluminescent light source being absorbed by the dye in the light guide.

Preferably, the spectral bandwidth of the emission spectrum of the radioluminescent light source and the spectral bandwidth of the absorption spectrum of the photoluminescent material of the light guides each amounts to at most 100 nm, preferably at most 80 nm. By these means with a suitable selection of dyes as photoluminescent material, e.g. zinc sulfide doped with Cu+– and Al3+ in the case of green light, the individual spectra can be separated effectively, so that there is as little overlap as possible.

Preferably, the spectral bandwidth of the emission spectrum of the radioluminescent light source and the spectral bandwidth of the absorption spectrum of the photoluminescent materials do not overlap. This also means that greater proportion of the light emitted by the radioluminescent light source passes through the light guide without being affected, i.e. unchanged in its wavelength. The level of absorption can be kept low in this way.

Preferably, in the visible range at most 30%, preferably at most 20%, of the emission spectrum of the radioluminescent light source overlap with the absorption spectrum of the photoluminescent material of the light guide.

Preferably, in the visible range at least 50%, preferably at least 70%, of the emission spectrum of the radioluminescent light source overlap with the emission spectrum of the photoluminescent material of the light guide. This measure means that the light of the radioluminescent light source and the photoluminescent light of the light guide have at least similar color tones which are adjacent to one another in the spectrum, whereby the visibility of the target mark can be increased. A variant is particularly preferred in which the light of the radioluminescent light source and the photoluminescent light of the light guide have the same color. Thus there are no differences in color between day and night. Furthermore, the target mark appears much brighter to the user.

Preferably, the emission spectrum of the radioluminescent light source is in the green and/or yellow wavelength range. The sensitivity of the human eye is greatest in the green wave range. The photometric light density and the radiometric beam density of green (i.e. emitting in the green wave range) or green-yellow tritium-light sources is much greater than that of blue or violet light sources of the same size. As the invention attempts as far as possible to "circumvent" the absorption spectrum of the light guide and also provide an easily visible target mark, for which green light is the most suitable, a green radioluminescent light source is a particularly preferred embodiment.

The main advantage is that it is possible to use green to yellow-green tritium-light sources (trigalights). The green and yellow-green tritium-light sources are generally much brighter (in photometric terms for the eye and radiometrically with respect to the number of photons) than the blue and orange and red ones. With the green to yellow-green tritium-light sources more light is available than for the other colours. Thus with the principle according to the invention of the same radioactivity (GBq tritium) more recognizable light can be generated compared to the prior art.

To produce green fluorescent light (easily visible to the eye) in the light guide it would be necessary to stimulate with a corresponding fluorescent dye with a blue tritium-light source (very dark). When using green tritium light sources (bright) in the light guide with a corresponding fluorescent dye orange or red fluorescent light can be generated (not easily visible to the eye).

The principle according to the invention differs in that the effect of photoluminescent stimulation in the light guide is kept as a low as possible by the light emitted by the radioluminescent light source and in that as large as possible a proportion of the light emitted by the radioluminescent light source is not affected, i.e. unchanged in its wavelength, and is used for the target mark.

Thus particularly preferably a green or green-yellow tritium-light source (bright) is used together with a green light guide, i.e. with a green photoluminescent dye (easily visible to the eye). The principle can also be used for other colours. However, the efficiency advantage is particularly great with green light. The use of other efficient luminescent materials than green is of course also included in the scope of the invention. In the presence of such an efficient luminescent pigment the functional principle of the invention can also be used for this color (e.g. yellow, red, orange, etc.).

Preferably, the emission spectrum of the photoluminescent material of the light guide is in the green wavelength range. The same advantages are achieved here as mentioned above, wherein the overlayering of the green light formed in the light guide and the light supplied by the radioluminescent light source results in exceptionally clear visibility of the target mark.

Preferably, the radioluminescent light source is arranged at an end side of the light guide, whereby light from the radioluminescent light source is directed through the end side into the light guide. By means of such a coupling light losses can be avoided efficiently, especially the light of the radioluminescent light source is unaffected (i.e. circumventing the absorption spectrum) through which the light guide is to be directed.

Preferably, the end side of the light guide is adhered by means of a transparent adhesive to the radioluminescent light source. This prevents light losses and provides a mechanically stable solution. As the adhesive preferably a so-called "reflection index matching" adhesive is used. The refractive index is adjusted by the adhesive so that the light can pass with minimal loss through the boundary surfaces.

Preferably, the radioluminescent light source has a longitudinal extension (i.e. it has an elongated form), which is perpendicular to the axis of the light guide in its end section. The light source thus projects over the end surface. In this way the loss of light can also be kept as low as possible even with an inexact positioning of the light source relative to the light guide.

Preferably, the end side of the light guide facing the radioluminescent light source has a polished surface, whereby the light enters without unwanted reflection on the end side. Preferably, this is a highly polished surface.

Preferably, the sight device comprises a reverse prism, preferably a Schmidt-Pechan prism, arranged in the beam path and the end side of the light guide, which faces away from the radioluminescent light source, is aligned to an in particular circular opening in a reflected plane surface of the reverse prism. Here the target mark can be produced as a high intensity light pattern.

A preferred embodiment is characterized in that the end side of the light guide facing away from the radioluminescent light source is a polished surface, which preferably faces a prism for directing the light into a beam path of the sight device. Said prism can be the aforementioned reverse prism, but also e.g. simply an (upstream) deflecting prism.

Both ends of the light guide are polished in an optimal case. This increases the light efficiency. This can be improved further by a "reflection index matching" adhesive. The polished surfaces at the ends of the ends of the light guide represent a preferred embodiment, however they are not absolutely necessary to achieve the basic concept of the invention.

Preferably, the radioluminescent light source is covered by an in particular opaque coating, wherein preferably the coating is a white color, particularly preferably a dye pigmented with TiO2. This increases the efficiency of the light source. Only in a limited area, which faces the light guide directly, does a light outlet opening remain free of the opaque coating. The coating is a reflection layer, which reflects back the light produced by the radioluminescent light source to the latter.

Preferably, the coating is applied onto the surface of the radioluminescent light source. In an alternative embodiment the coating is applied to the inner side of a housing surrounding the radioluminescent light source.

Preferably, the radioluminescent light source and an end section of the light guide bordering the radioluminescent light source is surrounded in an essentially form-fitting manner by a housing. This represents a compact, space-saving solution which ensures the necessary mechanical stability of the connection between the light source and light guide and ensures optimal protection from damage and dirt.

Preferably, the housing is formed from two parts, wherein preferably the two parts can be pivoted against one another or held together by means of a snap device. This measure facilitates the insertion and joining together of the light source and light guide, and the subsequent closing of the light source and the connecting point between the light source and light guide.

Preferably, the housing has at least one opening, which leads from the outside to the coupling point between the radioluminescent light source and the light guide, in particular for the introduction of an adhesive. Thus the light guide and light source can be aligned exactly and remain in position before they are adhered to one another. The assembly is considerably simplified in this way.

Preferably, in the housing there is at least one screw in a screw thread, by means of which the radioluminescent light source and/or an end section of the light guide bordering the radioluminescent light source is/are clamped. This enables a simple and reliable fixing of the parts in the desired position.

Preferably, the radioluminescent light source and an end section of the light guide bordering the radioluminescent light source are surrounded by an in particular T-shaped shrink tube. This allows a space-saving connection which is easy to achieve.

Preferably, the radioluminescent light source is molded in a material together with an end section of the light guide bordering the radioluminescent light source. In this way also a reliable and long-lasting connection is created which prevents dirt and impurities from the outside.

In the following further preferred aspects are listed briefly, which can be used separately or jointly.

The light guide is made from a green fluorescent plastic.

On at least one end side the light guide is highly polished; by polishing the end faces of the light guide and the special coupling of the tritium-light source and the light concentration in the region of the tritium light source with the opaque layer there should be an optimal use of energy of the tritium light for displaying the target mark in the (reflector) sight.

The light guide is aligned with a circular ring-like opening in a reflected plane surface of a Schmidt-Pechan prism.

On the opposite end side by means of a (reflection index matching) adhesive a tritium-light source is coupled by radiation.

The trigalight is covered at the beginning of the light guide with an opaque reflection layer, wherein a white opaque coating has proved to be an optimal solution; however also other reflection layers are possible for example silver or mirror coatings.

A section of the light guide joins the coupling of the light emitted by the tritium-light source or the connection of the tritium-light source to the light guide, via which the daylight can enter the light guide in radial direction.

The energy of the light emitted from the tritium light source should be as far as possible smaller than the absorption energy of the dye in the light guide; i.e. the tritium light source should if possible not cause the fluorescent and/or phosphorescent substances in the light guide to light up in order to avoid a loss of energy.

The ambient light or daylight should stimulate said fluorescent and/or phosphorescent substances to enable a display in the (reflector) sight.

BRIEF DESCRIPTION OF THE DRAWINGS

For a better understanding of the invention the latter is explained in more detail with reference to the following Figures.

In a much simplified, schematic representation.

DETAILED DESCRIPTION OF THE PREFERRED EMBODIMENTS

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

The exemplary embodiments show possible embodiment variants of the sight device and the lighting apparatus, whereby it should be noted at this point that the invention is not restricted to the embodiment variants shown in particular, but rather various different combinations of the individual embodiment variants are also possible and this variability, due to the teaching on technical procedure, lies within the ability of a person skilled in the art in this technical field.

Furthermore, also individual features or combinations of features from the various exemplary embodiments shown and described above can represent in themselves independent solutions according to the invention.

The problem addressed by the independent solutions according to the invention can be taken from the description.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

Mainly the individual embodiments shown in the Figures can form the subject matter of independent solutions according to the invention. The related objectives and solutions according to the invention can be taken from the detailed descriptions of said Figures.

Finally, as a point of formality, it should be noted that for a better understanding of the structure of the sight device and the lighting apparatus the latter and its components have not been represented true to scale in part and/or have been enlarged and/or reduced in size.

FIG. 1 to 7 show a lighting apparatus 2 for generating or illuminating a target mark in a sight device 1. An example of a sight device is represented purely schematically in FIG. 8. In the beam path those optical elements are shown which interact with the lighting apparatus 2. Other (also provided elements) have been omitted for a better overview.

The lighting apparatus 2 comprises an light guide 3 made from a photoluminescent, in particular fluorescent material and a radioluminescent light source 7 coupled to the light guide 3. The light guide 3 is designed to receive ambient light along at least a section 4 of its longitudinal extension and convert it into photoluminescent light.

Figure 9:
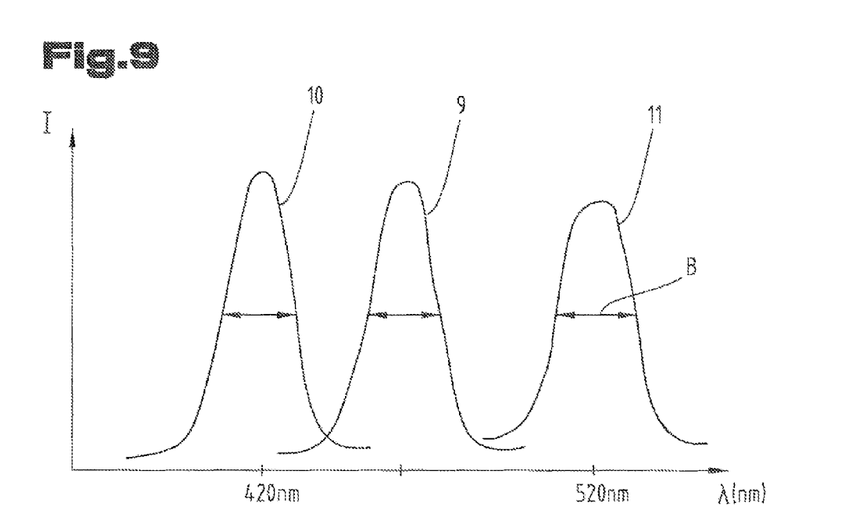
FIGS. 9 and 10 are example embodiments according to the invention for the emission spectrum of the radioluminescent light source and the emission and absorption spectra of the photoluminescent material of the light guide in a much simplified representation.
Figure 10:
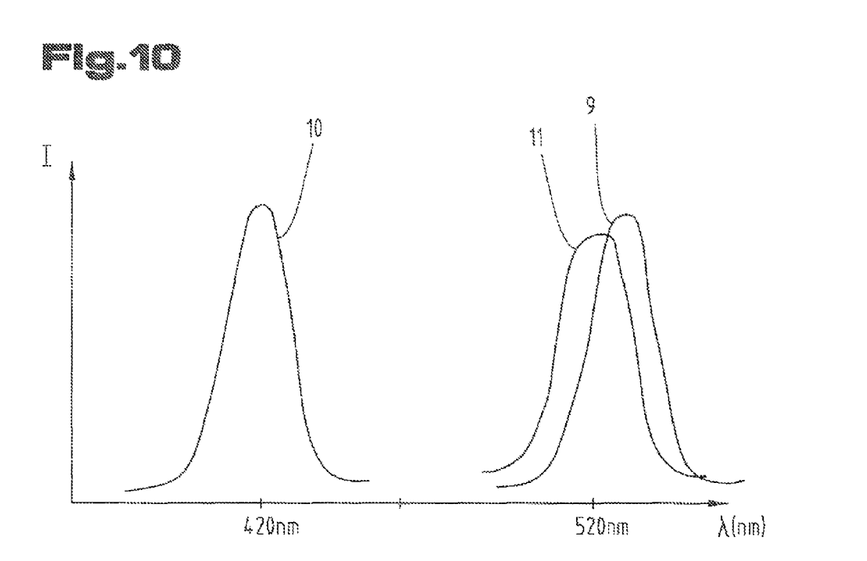

The absorption spectrum 10 of the photoluminescent material of the light guide 3 and the emission spectrum 9 of the radioluminescent light source 7 in the visible range can be characterized essentially by a spectral bandwidth (B) and a center wavelength (FIGS. 9 and 10). As shown in FIGS. 9 and 10 the center wavelength of the emission spectrum 9 of the radioluminescent light source 7 is greater than the center wavelength of the absorption spectrum 10 of the photoluminescent material of the light guide 3. The bandwidth is defined by the 'full width at half maximum' (FWHM) and the center wavelength by forming the average of the wavelength distribution.

In FIG. 9 the emission spectrum 9 of the radioluminescent light source 7 and the emission spectrum 11 of the photoluminescent material of the light guide 3 are spaced apart from one another (i.e. they do not overlap or only slightly overlap).

It is preferable, if—as also shown in FIG. 10—the center wavelength of the emission spectrum 9 of the radioluminescent light source 7 is at least 30 nm, preferably at least 50 nm, greater than the center wavelength of the absorption spectrum 10 of the photoluminescent material of the light guide 3.

In this case preferably the spectral bandwidth of the emission spectrum 9 of the radioluminescent light source 7 and the spectral bandwidth of the absorption spectrum 10 of the photoluminescent material of the light guide 3 each amounts to at most 100 nm, preferably at most 80 nm.

It is particularly preferable if—as shown in both FIGS. 9 and 10—the spectral bandwidth of the emission spectrum 9 of the radioluminescent light source 7 and the spectral bandwidth of the absorption spectrum 10 of the photoluminescent material of the light guide 3 do not overlap. This means that the bandwidth sections of the spectra 9 and 10 are completely outside one another.

It is also shown that in the visible range at most 30%, preferably at most 20%, of the emission spectrum 9 of the radioluminescent light source 7 overlaps with the absorption spectrum 10 of the photoluminescent material of the light guide 3.

The particular embodiment of FIG. 10 shows (unlike FIG. 9), that in the visible range at least 50%, preferably at least 70%, of the emission spectrum 9 of the radioluminescent light source 7 overlaps with the emission spectrum 11 of the photoluminescent material of the light guide 3.

Here the emission spectrum 9 of the radioluminescent light source 7 is in the green or green-yellow wavelength range and the emission spectrum 11 of the photoluminescent material of the light guide 3 is in the green wavelength range.

The selection of the corresponding radioluminescent light sources and the associated light guide according to the specifications of the invention is not difficult for a person skilled in the art. Many different types of light sources and light guides can be purchased commercially.

FIGS. 1 to 7 show that the radioluminescent light source 7 is arranged on an end side 6 of the light guide 3, whereby the light of the radioluminescent light source 7 is directed through the end side 6 into the light guide 3.

The radioluminescent light source 7 can have a longitudinal extension, which is perpendicular to the axis of the light guide 3 in its end section. The light source 7 and the end section of the light guide 3 together thus form a T-shape.

The radioluminescent light source 7 (also known as a "trigalight") need not necessarily be elongated. Preferably, the contact surface of the radioluminescent light source 7 is greater than the input surface of the light guide. It would also be possible to use quadratic and round radioluminescent light sources.

The radioluminescent light source 7 is covered by an opaque coating 8, wherein preferably the coating 8 is a white color, particularly preferably a color pigmented with TiO2. The end side 6 of the light guide 3 facing the radioluminescent light source 7 is a polished surface. The end side 6 of the light guide 3 is adhered by means of a transparent adhesive to the radioluminescent light source 7.

Figure 1:
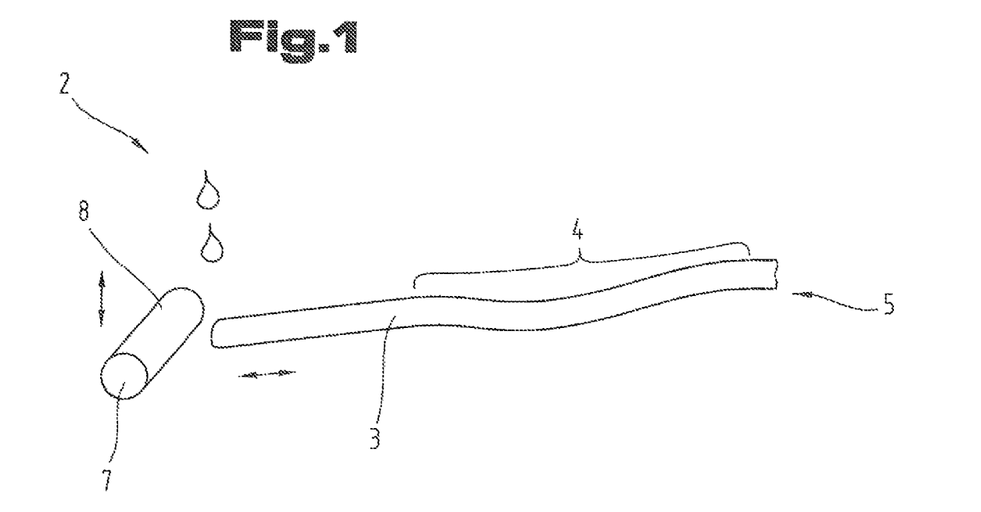
FIG. 1 is an example embodiment of a lighting apparatus for a sight device.
Figure 2:
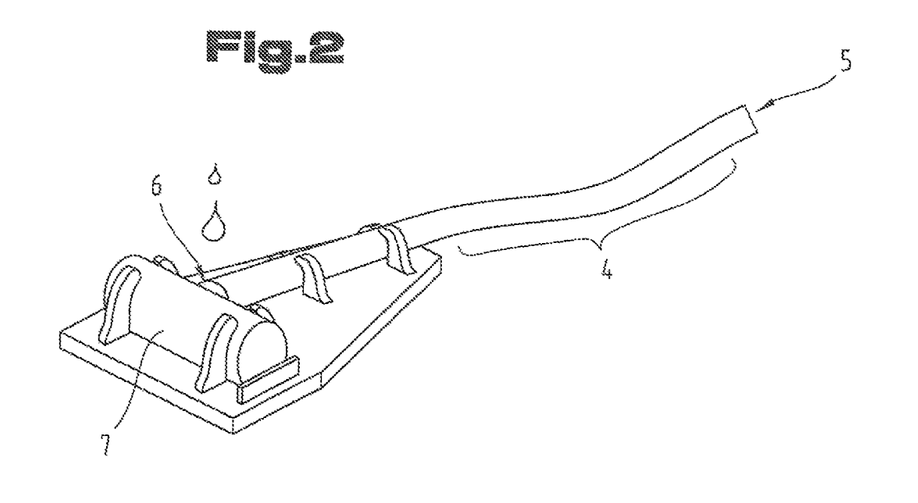
FIG. 2 is a further example embodiment with a single-use gauge.

In the embodiment shown in FIG. 2 the light source 7 and light guide 3 are positioned on a disposable gauge and fixed by clips. The disposable gauge is molded as well. In this way a reliable connection is obtained between the light source 7 and light guide 3. Of course, the radioluminescent light source 7 could be molded into a material together with an end section of the light guide 3 bordering the radioluminescent light source 7 even without positioning means, such as the disposable gauge.

Figure 3:
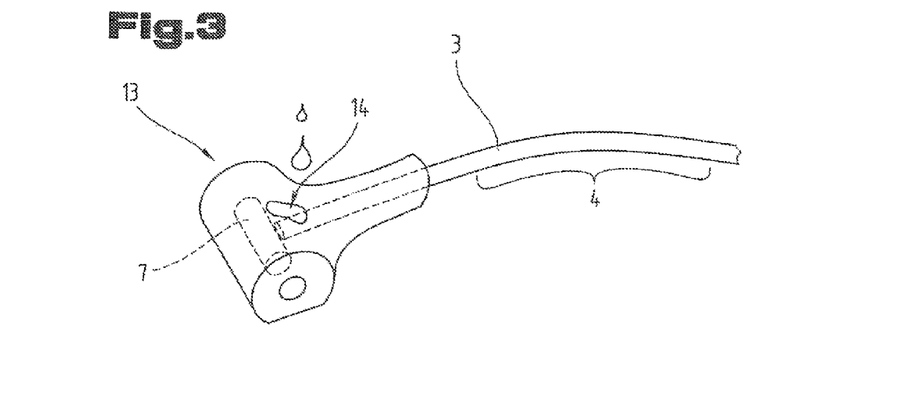
FIG. 3 to 7 are further example embodiments with a housing.

In the embodiment shown in FIG. 3 the radioluminescent light source 7 and an end section of the light guide 3 bordering the radioluminescent light source 7 are surrounded essentially by a housing 13 in a form-fitting manner. Openings are provided for introducing the light source 7 and light guide 3. The housing 13 comprises at least one further opening 14, which leads from the outside to the coupling point between the radioluminescent light source 7 and the light guide 3, in particular for introducing an adhesive.

Figure 4:
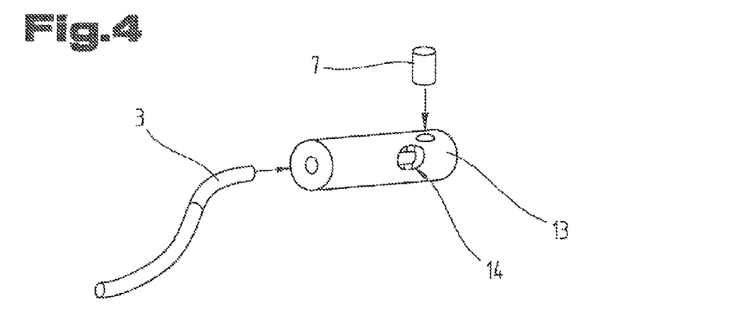

A similar embodiment, but with a different housing form is shown in FIG. 4.

Figure 5:
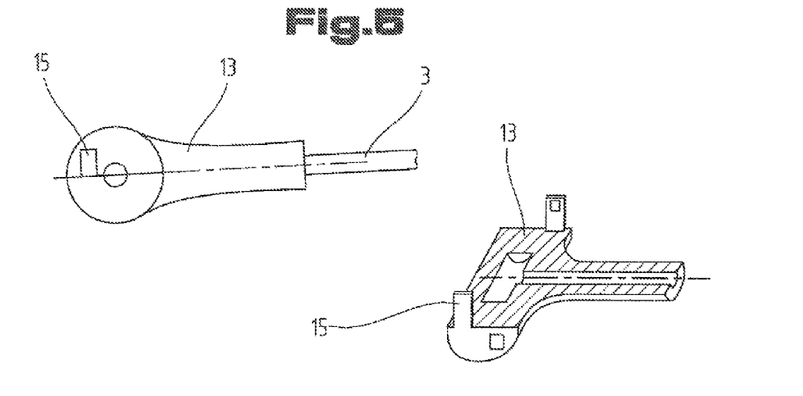

In the embodiment shown in FIG. 5 the housing 13 is made in two parts, which are joined or held together by means of a snap device 15.

Figure 7:
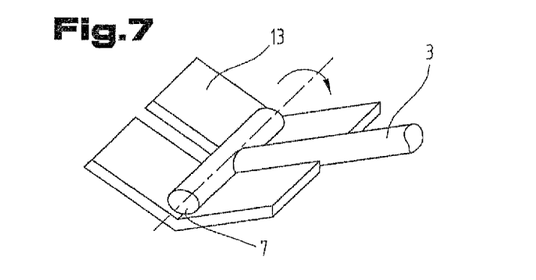

In the embodiment shown in FIG. 7 the two housing parts can be pivoted relative to one another, in order to move from an open position into a closed position.

Figure 6:
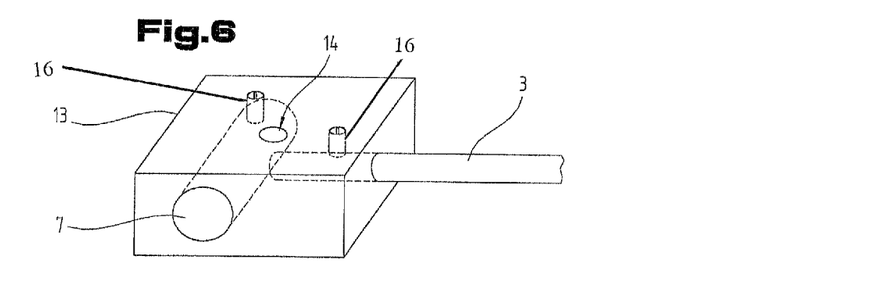

In the embodiment shown in FIG. 6, in the housing 13 at least one screw 16 sits in a screw thread, by means of which the radioluminescent light source 7 and/or an end section of the light guide 3 bordering the radioluminescent light source 7 is/are clamped.

In an alternative embodiment the radioluminescent light source 7 and an end section of the light guide 3 bordering the radioluminescent light source 7 are surrounded by an in particular T-shaped shrink tube.

In all of the embodiments of the lighting apparatus 2 described above it is preferred if by the attachment or provision of a reflective layer (e.g. white, silver, etc.) over the radioluminescent light source 7 the efficiency can be increased. The reflective layer could be an outer coating of the light source 7. Alternatively, the reflective layer can be formed on the inner side of the housing 13 surrounding the light source 7, i.e. the housing already has these reflecting properties.

Figure 8:
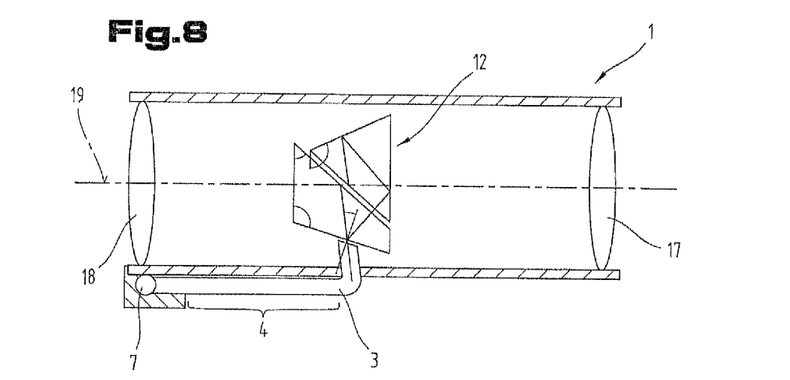
FIG. 8 is a sight device in schematic view.

Lastly, FIG. 8 shows a sight device 1, in particular in the form of a reflector sight or telescopic sight, which comprises a lighting apparatus 2 for generating or illuminating a target mark. The representation is purely schematic and should only be considered to represent one of several possibilities.

The sight device 1 of FIG. 8 comprises a lens 17, an eyepiece 18 and a reverse prism 12, in the form of a Schmidt-Pechan prism, arranged in the beam path 19 by means which the light of the lighting apparatus 2 is directed into the beam path 19. The end side 5 of the light guide 3, which faces away from the radioluminescent light source 7, is oriented with an in particular circular opening in a mirrored plane surface of the reverse prism 12.

It should be mentioned at this point that any other suitable optical element could be used for introducing the light of the lighting apparatus 2 into the beam path 19. As already mentioned above the invention can also be used for sight devices in which the lighting apparatus 2 illuminates a mechanical target mark.

LIST OF REFERENCE NUMERALS 1 sight device
2 lighting apparatus
3 light guide
4 section of the light guide 3
5 end side
6 end side
7 radioluminescent light source
8 opaque coating
9 emission spectrum of the radioluminescent light source 7
10 absorption spectrum of the photoluminescent material of the light guide 3
11 emission spectrum of the photoluminescent material of the light guide 3
12 reverse prism
13 housing
14 opening
15 snap device
16 screw
17 lens
18 eyepiece
19 beam path of the sight device 1

The invention claimed is:

1. A sight device, in particular a reflector sight or telescopic sight, which comprises a lighting apparatus for generating or illuminating a target mark,
    wherein the lighting apparatus comprises a light guide made of photoluminescent, in particular fluorescent material and a radioluminescent light source coupled to the light guide,
    wherein the light guide is designed to receive both the light produced by the radioluminescent light source as well as ambient light,
    wherein the light guide is configured to receive the ambient light along at least a section of a longitudinal extension of the light guide and to convert the ambient light into photoluminescent light,
    wherein the absorption spectrum of the photoluminescent material of the light guide and the emission spectrum of the radioluminescent light source in the visible range can both comprise a spectral bandwidth and a center wavelength,
    wherein the center wavelength of the emission spectrum of the radioluminescent light source is greater than the center wavelength of the absorption spectrum of the photoluminescent material of the light guide, and
    wherein the radioluminescent light source is covered by an opaque coating which reflects the light produced by the radioluminescent light source back to the radioluminescent light source, and the opaque coating is applied onto a surface of the radioluminescent light source.

2. The sight device as claimed in claim 1, wherein the center wavelength of the emission spectrum of the radioluminescent light source is at least 30 nm, preferably at least 50 nm, greater than the center wavelength of the absorption spectrum of the photoluminescent material of the light guide.

3. The sight device as claimed in claim 1, wherein the spectral bandwidth of the emission spectrum of the radioluminescent light source and the spectral bandwidth of the absorption spectrum of the photoluminescent material of the light guide each amounts to at most 100 nm, preferably at most 80 nm.

4. The sight device as claimed in claim 1, wherein the spectral bandwidth of the emission spectrum of the radioluminescent light source and the spectral bandwidth of the absorption spectrum of the photoluminescent material of the light guide do not overlap.

5. The sight device as claimed in claim 1, wherein in the visible range at most 30%, preferably at most 20%, of the emission spectrum of the radioluminescent light source overlaps with the absorption spectrum of the photoluminescent material of the light guide.

6. The sight device as claimed in claim 1, wherein in the visible range at least 50%, preferably at least 70%, of the emission spectrum of the radioluminescent light source overlaps with the emission spectrum of the photoluminescent material of the light guide.

7. The sight device as claimed in claim 1, wherein the emission spectrum of the radioluminescent light source is in the green and/or yellow wavelength range.

8. The sight device as claimed in claim 1, wherein the emission spectrum of the photoluminescent material of the light guide is in the green wavelength range.

9. The sight device as claimed in claim 1, wherein the radioluminescent light source is arranged at an end side of the light guide, whereby light of the radioluminescent light source is directed through the end side into the light guide.

10. The sight device as claimed in claim 9, wherein the end side of the light guide is adhered by means of a transparent adhesive to the radioluminescent light source.

11. The sight device as claimed in claim 9, wherein the radioluminescent light source has a longitudinal extension which is perpendicular to the axis of the light guide in its end section.

12. The sight device as claimed in claim 9, wherein the end side of the light guide facing the radioluminescent light source is a polished surface.

13. The sight device as claimed in claim 1, further comprising a reverse prism, preferably a Schmidt-Pechan prism, arranged in the beam path,
wherein the end side of the light guide, which faces away from the radioluminescent light source, is aligned to an in particular circular opening in a mirrored plane surface of the reverse prism (12).

14. The sight device as claimed in claim 1, wherein the end side of the light guide facing away from the radioluminescent light source is a polished surface, which preferably faces a prism for directing the light into a beam path of the sight device.

15. The sight device as claimed in claim 1, wherein the opaque coating has a white color.

16. The sight device as claimed in claim 1, wherein the radioluminescent light source and an end section of the light guide bordering the radioluminescent light source are surrounded by a housing essentially in a form-fitting manner.

17. The sight device as claimed in claim 16, wherein the housing is made in two parts, wherein preferably the two parts can be pivoted relative to one another or can be held together by means of a snap device.

18. The sight device as claimed in claim 16, wherein the housing comprises at least one opening, which leads from the outside to the coupling point between the radioluminescent light source and the light guide, in particular for introducing an adhesive.

19. The sight device as claimed in claim 16, wherein in the housing at least one screw sits in a screw thread, via which the radioluminescent light source and/or an end section of the light guide bordering the radioluminescent light source is/are clamped.

20. The sight device as claimed in claim 1, wherein the radioluminescent light source and an end section of the light guide bordering the radioluminescent light source are surrounded by an in particular T-shaped shrink tube.

21. The sight device as claimed in claim 1, wherein the radioluminescent light source together with an end section of the light guide bordering the radioluminescent light source is molded into a material.

22. The sight device as claimed in claim 1, wherein the opaque coating has a color pigmented with $TiO_2$.

* * * * *